United States Patent [19]

Smith

[11] 3,786,559

[45] Jan. 22, 1974

[54] COLD DIFFUSION WELDS IN A MICROCIRCUIT PACKAGE ASSEMBLY

[75] Inventor: James M. Smith, San Jose, Calif.

[73] Assignee: Hewlett-Packard Company, Palo Alto, Calif.

[22] Filed: May 22, 1972

[21] Appl. No.: 255,859

Related U.S. Application Data

[63] Continuation-in-part of Ser. No. 145,457, May 20, 1971.

[52] U.S. Cl. .................. 29/470.1, 29/479, 29/497.5
[51] Int. Cl. .............................................. B23k 21/00
[58] Field of Search .. 29/470.1, 478, 479, 484, 475, 29/497.5, 475

[56] References Cited

UNITED STATES PATENTS

| | | | |
|---|---|---|---|
| 2,703,997 | 3/1955 | Sowter | 29/470.1 |
| 3,058,209 | 10/1962 | Nijhius et al. | 29/470.1 |
| 3,219,748 | 11/1965 | Miller | 29/470.1 |
| 3,226,820 | 1/1966 | Anthony et al. | 29/470.1 |
| 3,242,555 | 3/1966 | Weber | 29/470.1 X |
| 3,474,523 | 10/1969 | Musso et al. | 29/470.1 X |
| 3,664,012 | 5/1972 | Wilke et al. | 29/470.1 X |

*Primary Examiner*—Richard B. Lazarus
*Attorney, Agent, or Firm*—Roland I. Griffin

[57] ABSTRACT

A hermetically sealed package for microcircuits is provided with a base plate on which one or more microcircuits are mounted by, for example, soldering them thereto or by means of studs, the studs being positioned in the base plate so as to accommodate the microcircuits which are held down on the plate, for example, by spring fasteners mounted on the studs. The microcircuits may be mounted on a heat conductive carrier base. Electrical feedthroughs by hermetically sealed in the base plate. In certain forms of the package, an isolation wall structure is employed to electrically isolate one microcircuit from another, the wall being secured to the base plate via studs and stud fasteners. The studs and feedthroughs are attached and hermetically sealed to the base plate by inserting them into holes in the base plate while simultaneously forcing the holes to shrink in size, thereby forming a diffusion weld between the studs (and feedthroughs) and the base plate. A cover, which is thin compared to the base plate, is attached and hermetically sealed to the base plate over the microcircuits, carrier, isolation wall and feedthroughs. This is accomplished by employing a tool with an inclined surface to form a diffusion weld between the cover and the base plate.

6 Claims, 16 Drawing Figures

COLD DIFFUSION WELDS IN A MICROCIRCUIT PACKAGE ASSEMBLY

CROSS-REFERENCE TO RELATED APPLICATION

This is a continuation in part of U. S. Pat. Application Ser. No. 145,457 filed on May 20, 1971, by James M. Smith and George A. Drennan and entitled MICRO-CIRCUIT PACKAGE ASSEMBLY.

BACKGROUND OF THE INVENTION

As hybrid microcircuits become more prevalent in modern electronic equipments, the packaging of such circuits plays an increasingly important role in their production and sale. Such packaging generally comprises a strong base structure for supporting the substrate or substrates on which the hybrid microcircuitry is formed and for dissipating heat that may be generated by the circuitry in operation, means for securely affixing the substrate to the base structure, electrical feed-through devices for feeding d.c. and a.c. voltages into and out from the package, and a cover or envelope structure hermetically sealing the hybrid microcircuit from the environment and for protecting the circuit structure from physical damage.

The manufacturing cost of hybrid microcircuits per unit device is steadily decreasing as a result of more efficient design and fabrication techniques, and it is necessary that the cost of the circuit packaging decreases in proper proportion to obtain the full benefits of cost savings without sacrifice of the desirable characteristics of such packaging. However, as the different types of hybrid microcircuits increase in number, with varying sizes and forms, the tendency is to utilize individual customized packages with the result that the packaging elements proliferate and package costs mount. In addition, the tendency has been to adapt packaging concepts heretofore employed in expensive, customized, small lot production, resulting in an overall expensive packaging for hybrid microcircuits.

In conventional metal microcircuit packages, feedthroughs and other such elements are typically attached to each package and hermetically sealed in place by employing conventional soldering, brazing, or glass-to-metal sealing techniques. These techniques cannot easily be used with some metals, such as aluminum, that might otherwise be employed to reduce the overall cost of the package. A relatively thin lid may also be attached to the package and hermetically sealed in place by diffusion welding the relatively thin lid to a relatively thin portion of the package or a protrusion specially formed for this purpose on the package. These diffusion welding techniques typically cannot be employed to weld a relatively thin lid or other relatively thin member to a relatively thick portion of the package or other relatively thick member.

SUMMARY OF THE INVENTION

The present invention provides apparatus for use in the packaging of hybrid microcircuits whereby a relatively large number of diverse forms of hybrid microcircuits may be packaged with a relatively few number of standardized components, the components being simple in form and inexpensive in fabrication. Relatively simple assembly techniques are required in the final assembly of the package. In addition, the assembly techniques are such that the hermetically sealed envelope may be readily opened for access to the hybrid microcircuit for reworking.

In the present invention, a base plate is provided for use with many different sizes and numbers of hybrid microcircuit substrates and in certain assemblies the substrates are affixed to the base plate as by soldering. In other assemblies standard studs are supplied for mounting in the base plate in various patterns to accommodate the various shapes of the substrates. Simple hold-down means, including spring clips, are used in conjunction with the studs to removably secure the substrates to the base plate. The spring clips perform a dual function in urging the substrates down onto the base plate in good thermal conducting contact and serving, at times, as grounding straps between circuit terminals on the substrates and the base plate.

The studs also serve to position and to secure isolation walls to the base plate when such walls are needed to r.f. isolate one circuit from another within the package.

In one preferred form of the invention, the base plate is made of a ductile metal and the studs are attached and hermetically sealed to the base plate by inserting them into holes in the base plate while simultaneously forcing the holes to shrink in size, thereby forming a diffusion weld between the studs and the base plate. The r.f. and d.c. feedthrough units are designed so that they may be attached and hermetically sealed to the base plate by the same diffusion welding technique. A diffusion weld is also utilized to hermetically seal a relatively thin ductile package cover to the relatively thick base plate in such a manner that the cover may be pulled off the base plate for access to the microcircuits and another cover thereafter diffusion welded to the base plate to form another tight envelope. This is accomplished by employing a tool having an inclined surface to form a diffusion weld between the relatively thin cover and the relatively thick base plate.

In one form of microcircuit package, the electrical connections are brought through the base plate whereas in another form the connections are brought through a side plate.

DESCRIPTION OF THE PREFERRED EMBODIMENTS

Figure 1:
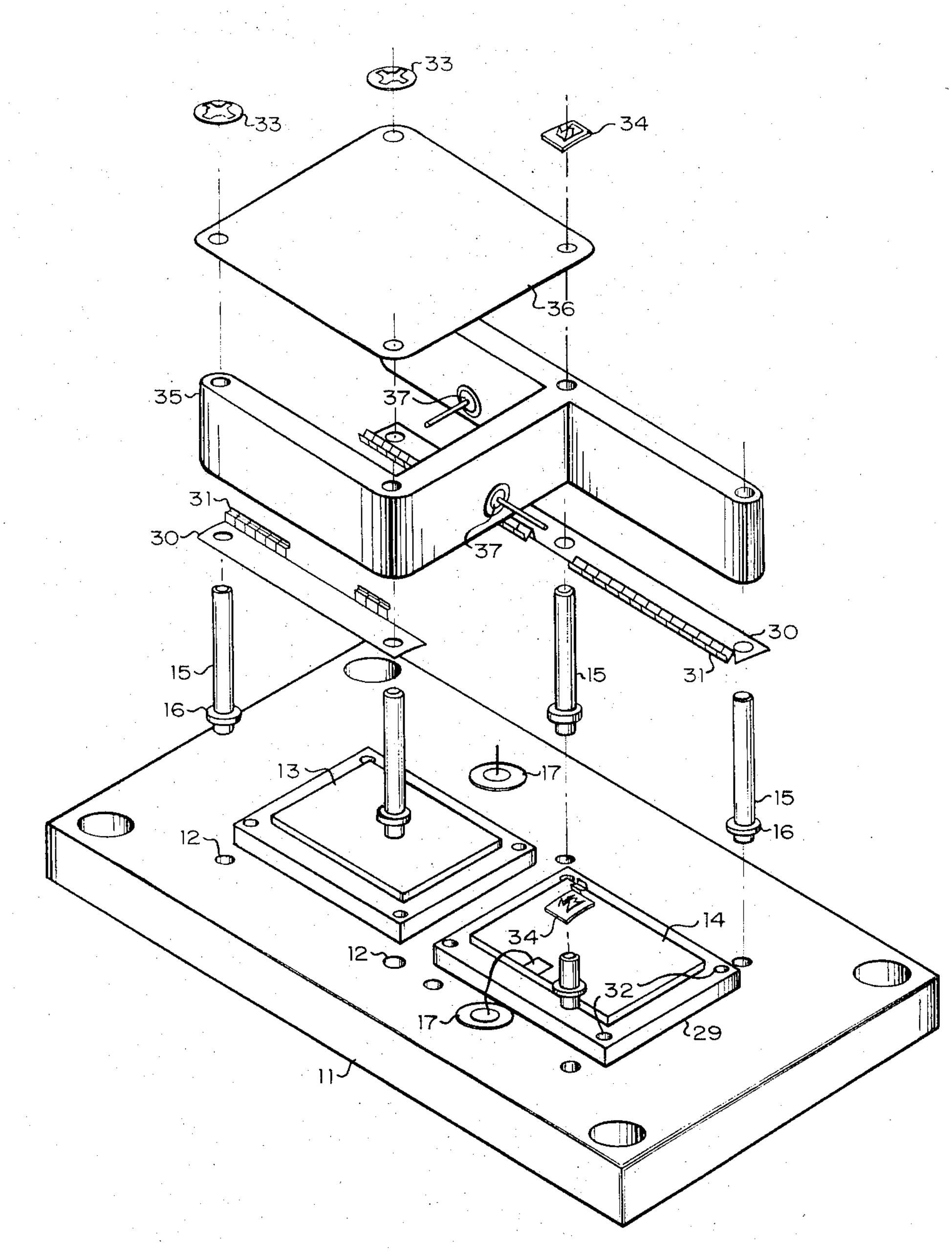
FIG. 1 is an exploded perspective view showing a standard package assembly according to one of the preferred embodiments of the present invention.
Figure 2:
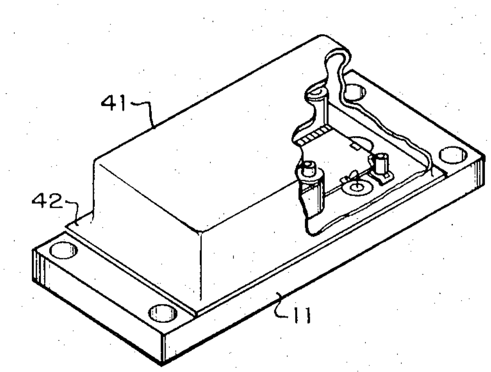
FIG. 2 is a perspective view partly cut away showing the completed package assembly of FIG. 1.

Referring now to FIGS. 1 and 2, the novel microcircuit package of the present invention comprises a rectangular base plate 11 which, for different packages, may be rectangular or circular. One suitable plate is ⅛ inch thick aluminum alloy, known in the trade as 6061 T4 Aluminum, having holes 12 punched or drilled therein in a selected pattern suitable for accommodating the particular microcircuits to be mounted thereon. In this illustration, two rectangular microcircuit substrates 13 and 14 are to be mounted in the package.

To insure good welds with the diffusion welding techniques described below, it is necessary that the plate 11 be clean and of suitable ductility. It is therefore desirable that the plate be provided with a suitable coating. For this purpose, the aluminum plate is first plated with zincate followed by nickel plating, with a final electrolytic gold plate. Plating less than $150\mu$ inches of nickel and $50\mu$ inches of gold on the base plate forms an outer surface which is easily cleaned and degreased and also provides a minumum aluminum oxide layer on the aluminum plate surface to optimize the diffusion weld properties. Thus, typically only a normal cleaning process is subsequently needed to prepare the base plate surface for the diffusion welding of the cover 41 (see FIG. 2) described below.

The studs 15 are made from beryllium copper, phosphorus bronze, or steel rod cut to the proper length, for example 50 mil diameter cut ¼ inch long. The studs are provided with about a one mil thick copper coating and may be provided with seating flanges 16.

Figure 3:
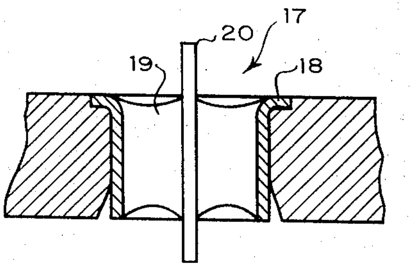
FIG. 3 is a cross-section view of a d.c. feedthrough utilized in the microcircuit package of FIGS. 1 and 2.

The d.c. feedthroughs 17 (FIG. 3) comprise a cylindrical flanged eyelet 18 of cold rolled steel or Kovar having an internal glass seal 19 and a 52 alloy or a Kovar pin 20 sealed in the axial center and extending from either end of the eyelet for electrical connection. The eyelet is provided with a few mils coating of copper on its outside surfaces.

Figure 4:
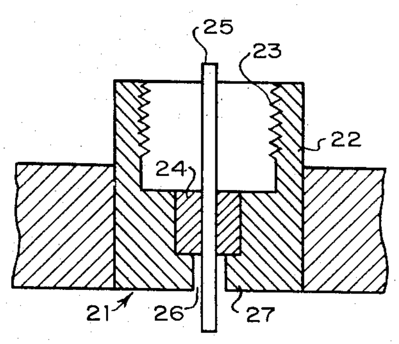
FIG. 4 is a cross-section view of an r.f. feedthrough utilized in the microcircuit package of FIGS. 1 and 2.

The r.f. feedthroughs 21 (FIG. 4) comprise a copper coated cylindrical housing 22 having a U-shaped cross-section, the larger diameter section of the housing having an internally threaded surface 23 for accommodating the threaded end of the input coupling. A glass seal 24 is sealed in the smaller diameter end of the housing 22 and has a gold plated Kovar pin 25 sealed axially therein. A 50 Ω air line 26 is formed between the inner portion of the pin 25 and the small opening in the end wall 27 of the housing 22 to provide a good electrical match into the structure.

Figure 5:
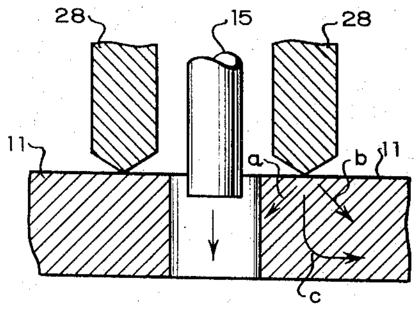
FIG. 5 is a cross-section view of a standard stud about to be diffusion welded into the base plate of the microcircuit package of FIGS. 1 and 2.

The studs 15 and the feedthroughs 17 and 21 are hermetically sealed into the holes 12 in the base plate 11 by diffusion welding in accordance with the technique illustrated in FIG. 5. As the stud 15 begins to enter the hole, the weld fixture 28 applies a force to the surface of the plate surrounding the hole and the surface of the hole begins to tighten on the stud. As the force on the plate surface increases, the plate tightens on the stud at the same time the stud is being forced into the hole, providing a scrubbing action between the zincate, nickel, and gold plated aluminum plate and the copper plated beryllium copper stud. The scrubbed metal is exposed, and the combined radially directed force and axially directed scrubbing result in a diffusion weld between the stud and plate which meets the industry mil standard 883, section 1014, for hermetic sealing.

The combined scrubbing and radial force is also utilized to diffusion weld the r.f. and d.c. feedthroughs into the plate, the diffusion weld being formed between the base aluminum of the plate and the copper coating of the eyelet, since the scrubbing action exposes clean metal. Generally speaking, dissimilar ductile materials such as aluminum and mild steel or aluminum and copper may be joined; similar materials such as aluminum and aluminum, copper and copper, or gold and gold may be joined.

The end of the weld fixture 28 contacting the surface of the plate 11 is designed so that, in addition to the inward radially directed flow represented by arrow *a*, it also produces an outward and downward radial flow represented by arrow *b*. This flow *b* serves to counteract the flow represented by arrow *c* tending to bend or warp the plate 11. For optimum heat transfer the plate must be flat to maximize surface contact with the carriers.

With the studs and feedthroughs diffusion welded in the plate 11, the microcircuit units are then set onto the plate and properly positioned relative to the studs 15 and feed-throughs 17, 21. In a preferred embodiment, the microcircuit units include a carrier base 29 on which the microcircuit substrates 13, 14 are fixedly secured, as by soldering, or are held by means of spring clips 30 having spring fingers 31. The carriers 29 are flat pieces of copper cut to shape by copper etching or by stamp forming. These carriers serve as heat spreaders for the substrate, the soldered junction between the substrate and carriers providing good heat transfer.

The carriers 29 are held down onto the base plate 11 with nuts threaded down on the studs passing through holes 32 in the carrier, or with Tinnerman Speed-nuts 33, or with self-locking spring clips 34, or with the isolation wall 35 described below followed by a nut or Tinnerman Speed-nut, or equivalent. The spring clips 30, 31 may also serve to engage microcircuit terminals on the substrates and ground them to the base plate 11. In some instances it may be desirable to mount the substrates 13, 14 directly onto the base plate 11 and omit the carrier 29.

Figure 6:
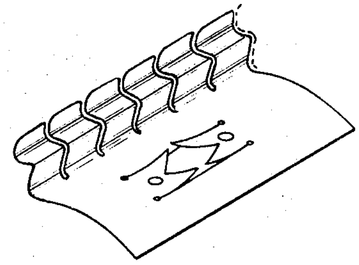
FIG. 6 is an enlarged perspective view of one of the grounding springs utilized in the microcircuit package of FIGS. 1 and 2.

The spring clips 30, 31 may be self locking (see FIG. 6) on the studs. Both forms of fasteners 33, 34 are removable so that the carriers 29 and substrates 13, 14 may be removed from the base plate 11 for reworking or replacement.

At times it is desired that a microcircuit be mounted on the base plate 11 at a higher elevation than another microcircuit. In such case, the former microcircuit may be mounted on one carrier 29 and this carrier in turn mounted atop a second carrier, these three elements being held down on the base plate by nuts, Tinnerman Speed-nuts, or by spring clips. The microcircuit substrate may be soldered to the first carrier or it may be held down thereon by the spring clip.

In certain packages it is desirable that one microcircuit be r.f. isolated from another microcircuit, and for this purpose an isolation wall 35 of proper configuration may be mounted on the base plate 11 by the studs and fasteners along with a cover 36. One preferred form of isolation wall is made from extruded aluminum, the wall being cut therefrom in the proper height. Where electrical interconnections are to be made between microcircuits on different sides of the isolation wall, a simple r.f. feedthrough 37 comprising a central conductor rod and a dielectric ring carrying the rod and placed in the isolation wall maintains good r.f. isolation and transmission between adjacent sections.

Figure 7:
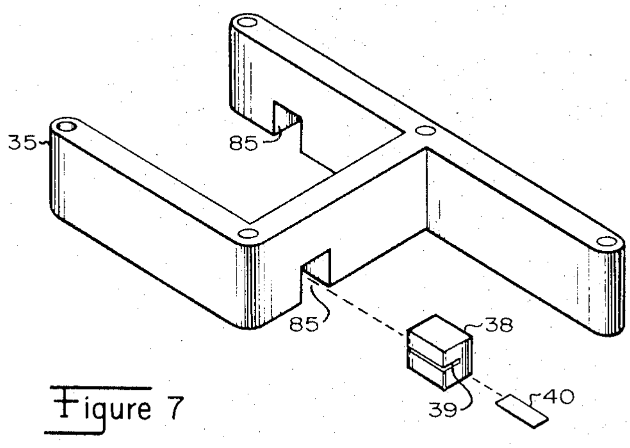
FIG. 7 is a perspective view of one form of isolation wall that may be used in the microcircuit package of FIGS. 1 and 2.

Referring to FIG. 7, the isolation wall may be provided with a notch 85, rather than a hole, and the feedthrough may fit in the notch so that the wall 35 may be removed without removing the feedthrough connector. The dielectric may be a block 38 with a groove 39 therein, and the connector may be a ribbon 40 which may be bonded at both ends to the substrates before the block 38 is slipped over the ribbon and the wall 35 lowered down on the studs 15.

After internal electrical connections have been made between the microcircuits and with the r.f. and d.c. feed-throughs 17, 21, for example, by means of gold ribbon conductors, the assembly is ready to receive the cover (FIG. 2.). In one preferred embodiment the cover 41 is a thin sheet, e.g. 20 thousandths of 6061 TO aluminum which is formed to the cover shape desired, including the flange 42, and is plated in the same manner as described above for the base plate. The cover 41 may be prepared for welding by chemically cleaning and deoxidizing, by metal removal, or by electroplating. For example, the cover 41 may be chemically cleaned and then deoxidized in Kelite 822, a product normally used to prepare aluminum for spot welding. This product is described in U. S. Pat. 2,710,792 and is manufactured and sold by the Allied-Kelite Products Division of Richardson Chemical Company in Los Angeles, California. The cleaned and deoxidized cover should be used within 48 hours after it has been exposed to air.

Figure 8A:
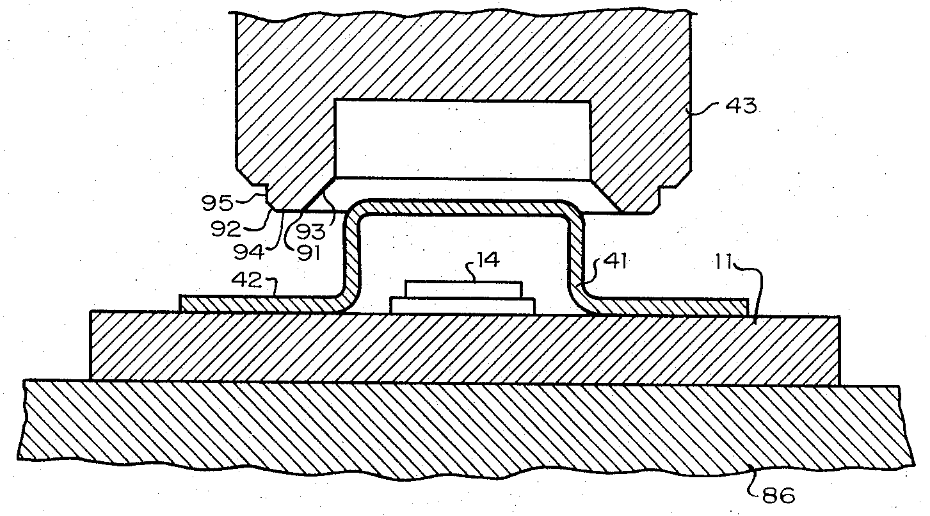
FIG. 8A is a cross-section view of the cover, the base plate, and the tool employed to form a diffusion weld between the cover and the base plate of the microcircuit package of FIGS. 1 and 2.

As shown in FIG. 8A, the base plate 11 is placed on a flat support structure 86, the cover 41 is placed on the base plate 11 over the microcircuit assembly to be enclosed, and a welding fixture 43 is positioned adjacent to the flange 42 of the cover 41 in preparation for cold welding the cover to the base plate. The welding fixture 43 is then moved downward into abutment upon the flange 42 of the cover 41 and forced further downward toward the support structure 86. As the welding fixture 43 moves towards the support structure 86, cold diffusion welding occurs between the flange 42 of the relatively thin cover 41 and the relatively thick base plate 11. At the same time, a portion 87 (see FIG. 8B) of the flange 42 located outside the welding fixture 43 is cut by the welding fixture and may therefore be removed once the welding fixture is withdrawn.

Figure 8B:
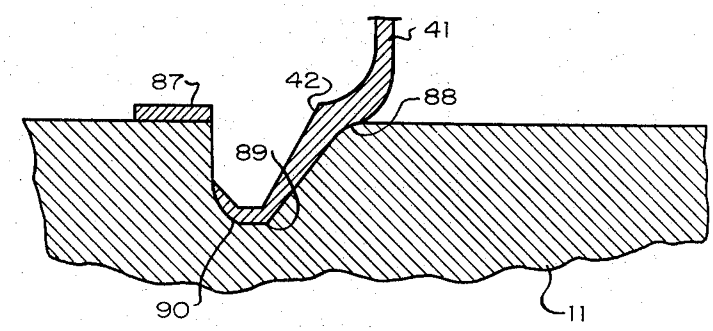
FIG. 8B is a cross-section view of portions of the cover and the base plate after they have been diffusion welded together.

As best shown in FIG. 8B, welding fixture 43 forces flange 42 of the cover and base plate 11 to yield downwardly and stretches the portions of their interface surfaces defined between 88 and 89. The force applied by the welding fixture 43 normal to the interface between 88 and 89 together with the stretching of the portions of the interface surfaces defined between 88 and 89 produces a cold diffusion weld of flange 42 of the cover and base plate 11 between 88 and 89. This weld is not continuous at 88 since the force and stretching there are minimal but is continuous and strong at 89 and may even extend to 90. In the case of gold plated aluminum parts the weld may start at 88 with diffusion between the gold platings and finish at 89 as aluminum-to-aluminum diffusion with chunks of interspersed plating. Reference numeral 88 designates the location on base plate 11 at which the surface of the base plate begins to slope downwardly from the distortion caused by the cover welding operation. Reference numeral 89 designates the corner produced in base plate 11 by the corner 91 of welding fixture 43. Reference numeral 90 designates the corner produced in the base plate 11 by the corner 92 of welding fixture 43.

With reference to welding fixture 43 of FIG. 8A, the weld between flange 42 of the cover and base plate 11 occurs below surface 93 and possibly below surface 94 of the welding fixture. The surface 95 of the welding fixture is parallel to the direction of movement of the welding fixture and serves to trim portion 87 of flange 42 of the cover. The angle made between surfaces 95 and 93 is somewhat critical. If it is too acute, the thin cover material tends to be sheared. If it is too obtuse, no weld occurs because there is insufficient stretching. An angle of 42° seems to be close to optimum for AA–6061 aluminum, T–0 hardness cover material and T–4 hardness base material.

No special machining or shaping of the welding surfaces is required as with prior welded assemblies. The flat clean surface of flange 42 of cover 41 mated with the flat clean surface of base plate 11 is sufficient combined with the proper force and metal stretching.

With the above-described diffusion welding technique it has been found that the cover, although strongly and hermetically sealed to the plate per mil standard 883, section 1014, can be pulled off of the plate for access to the microcircuits, and a new cover replaced on the base plate by the same diffusion welding technique. The diffusion weld can be formed at the very same seal position or can be sealed along a slightly enlarged or reduced seal periphery.

Figure 9:
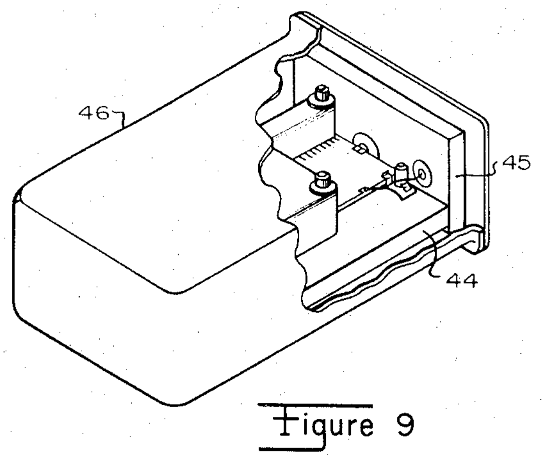
FIG. 9 is a perspective view partly cut away of a microcircuit package according to another of the preferred embodiments of the present invention wherein the connections are brought out through a side plate of the package.

In the embodiment of FIGS. 1 and 2 the feedthroughs were all mounted in the base plate 11. In the form shown in FIG. 9, the base plate 44 is formed with an integral side wall portion 45, and all of the feedthroughs are mounted in the sidewall 45. The cover 46 is diffusion welded to the side wall 45 to form the hermetic seal for the package.

Figure 10:
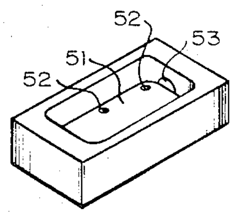
FIGS. 10, 11, and 12 are perspective views of other forms of the microcircuit package envelope of the present invention.

In the embodiment shown in FIG. 10, the base plate takes the form of a box with four sides and a bottom 51, the stud holes 52 being located in the bottom wall 51 on which the microcircuit assembly is mounted. The feedthroughs are diffusion welded into holes 53 side walls. After assembly, a cover may be diffusion welded over the open top of the box.

Figure 11:
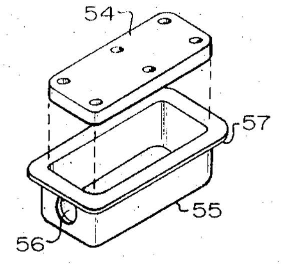

In the embodiment of FIG. 11, the base plate 54 may be deposited in an aluminum or copper can 55 and secured to the bottom thereof. Feedthroughs are diffusion welded into holes 56 in the sides of the can and a cover diffusion welded over the top of the can to the flange 57.

Figure 12:
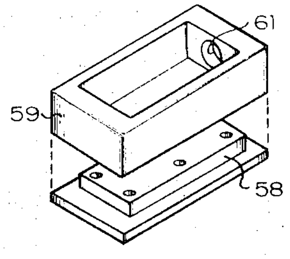

Referring to FIG. 12, the base plate 58 may be attached, for example, by diffusion welding to one open end of an aluminum or copper frame 59 to form the bottom wall of the package. The feedthroughs are diffusion welded in openings 61 in the side wall. A cover is diffusion welded over the top of the frame.

Figure 13:
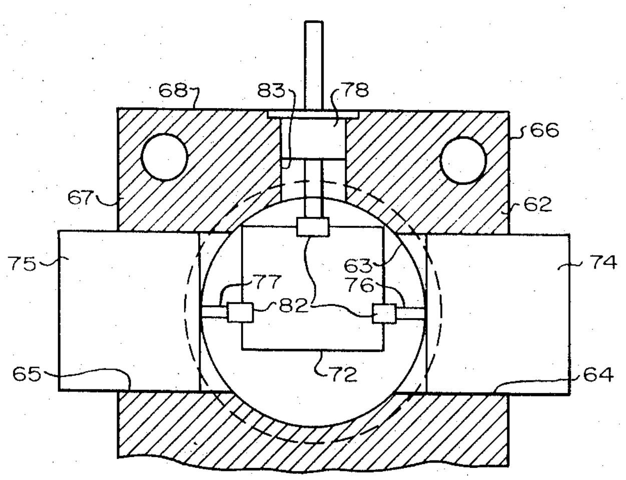
FIGS. 13 and 14 are top and side views, respectively, of another form of microcircuit package incorporating the present invention.
Figure 14:
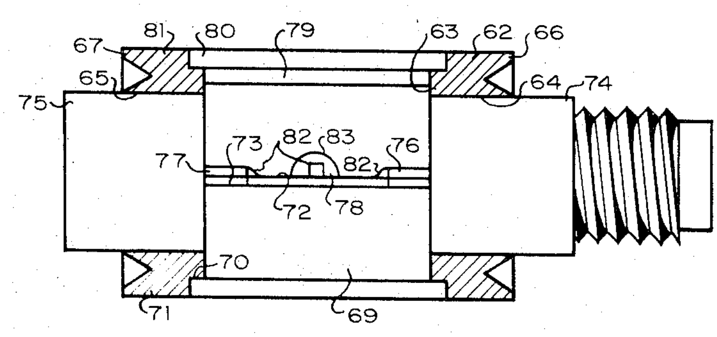

Another embodiment of this invention is shown in FIGS. 13 and 14 comprising a rectangular shaped block 62 of aluminum having an axial bore 63 extending therethrough in the vertical direction, two bores 64 and 65 extending through opposite sides 66 and 67, respectively, of the block 62 and normal to said vertical axis, and another bore 83 extending through a third side 68 and normal to said vertical axis as shown in FIG. 13.

A circular, solid base plate 69 with an outer flange portion 70 is diffusion welded into the axial bore in the bottom wall 71 of the block, the microcircuit 72 being affixed to the inner end 73 of the base plate 69 as by soldering.

A pair of r.f. feedthroughs 74 and 75 are diffusion welded into the two bores 64, and 65, respectively, in the side walls, the internal connectors 76, 77, and 78 connecting with the microcircuit terminals by bonded gold ribbon 82. A d.c. feedthrough 78 is diffusion welded into the bore 83 in the other side wall 68.

A circular cover 79 having flange portion 80 is diffusion welded into the bore in the top wall 81 of the block.

I claim:

1. A method for affixing a first cylindrical shaped metallic member having a ductile outer surface within a cylindrical opening in a second metallic member, the opening having a ductile surface and also a slightly larger internal diameter than the external diameter of said cylindrical member, comprising the steps of simultaneously directing the cylindrical member into said opening and applying a force to the surface of said second member around said opening to force the inner ductile surface of the opening against the outer ductile surface of said cylindrical member, the two surfaces scrubbing against each other, the force of the opening surface against the cylindrical member surface producing a diffusion weld between the surfaces.

2. A method as in claim 1 wherein said two members are first plated with a ductile metal suitable for cold welding, the metal of one of said members being harder than the metal of the other.

3. A method as in claim 2 wherein said ductile metal comprises copper or gold.

4. A method as in claim 1 wherein said second metallic member is aluminum with the opening having a ductile inner surface of copper or gold.

5. A method as in claim 4 wherein the ductile metal surface of said cylindrical member is copper or gold.

6. A method as in claim 1 wherein the force of the opening surface against the cylindrical member surface also produces a hermetic seal between these surfaces.

* * * * *